US009855878B1

(12) United States Patent
Maxwell

(10) Patent No.: US 9,855,878 B1
(45) Date of Patent: Jan. 2, 2018

(54) LOAD-SUPPORTING DRIVE OVER WHEEL CHOCK FOR A TRAILER BED

(71) Applicant: Cody L Maxwell, Brenham, TX (US)

(72) Inventor: Cody L Maxwell, Brenham, TX (US)

( * ) Notice: Subject to any disclaimer, the term of this patent is extended or adjusted under 35 U.S.C. 154(b) by 0 days.

(21) Appl. No.: 15/411,845

(22) Filed: Jan. 20, 2017

Related U.S. Application Data

(60) Provisional application No. 62/321,625, filed on Apr. 12, 2016.

(51) Int. Cl.
  *B60P 7/08* (2006.01)
  *B60P 3/077* (2006.01)
  *B60P 7/135* (2006.01)

(52) U.S. Cl.
  CPC ............ *B60P 3/077* (2013.01); *B60P 7/0892* (2013.01); *B60P 7/135* (2013.01)

(58) Field of Classification Search
  CPC .......... B60P 3/077; B60P 7/135; B60P 7/0892
  USPC .................. 410/7, 9, 30, 49, 50; 188/32, 36
  See application file for complete search history.

(56) References Cited

U.S. PATENT DOCUMENTS

| 1,757,866 A | * | 5/1930 | Johnson .................... B60T 3/00 410/30 |
| 2,480,121 A | * | 8/1949 | Cupp ...................... B60P 3/077 410/30 |
| 3,800,917 A | | 4/1974 | Vick |
| 4,399,893 A | | 8/1983 | Switzer |
| 5,028,463 A | * | 7/1991 | Cahill ..................... B29C 70/70 428/101 |
| 6,113,326 A | * | 9/2000 | Nicholson ............... B60P 3/062 410/19 |
| 8,579,564 B2 | * | 11/2013 | Glickman ............... B60P 3/077 410/12 |
| 2004/0226780 A1 | * | 11/2004 | Olson ....................... B60T 3/00 188/36 |

OTHER PUBLICATIONS

Ironton Double-Sided Pyramid Chock-Rubber, Apr. 8, 2016 available at http://web.archive.org/web/20160408183945/http:/www.northerntool.com/shop/tools/product_200594355_200594355.

* cited by examiner

*Primary Examiner* — Stephen T Gordon
(74) *Attorney, Agent, or Firm* — Plager Schack LLP

(57) ABSTRACT

A load-supporting chock for use with a trailer bed and designed to permit a vehicle to drive over the chock is provided. The load-supporting chock includes an elongated member mechanically coupled to the bed of the trailer, the elongated member having a top face, a bottom face opposite the top face, a first slanted face coupled to the top and bottom faces, and a second slanted face coupled to the top and bottom faces, each of the first and second faces having a plurality of generally triangular ridges, the top face and first slanted face connecting at a first junction with a first rounded corner, the top face and second slanted face connecting at a second junction with a second rounded corner.

5 Claims, 3 Drawing Sheets

LOAD-SUPPORTING DRIVE OVER WHEEL CHOCK FOR A TRAILER BED

RELATED APPLICATION

The application claims priority to provisional patent application U.S. Ser. No. 62/321,625filed on Apr. 12, 2016, the entire contents of which is herein incorporated by reference.

BACKGROUND

The embodiments herein relate generally to wheel chocks for vehicles.

Wheel chocks are wedges placed against tires of a vehicle to prevent movement of the vehicle. Current wheel chocks for 4-wheeled vehicles include portable chocks that are designed to be set against each tire of the vehicle. Examples of these chocks include Ironton's double-sided chock and the devices in U.S. Pat. Nos. 4,399,893 and 3,800,917. These devices are a burden because a user is required to place two to four individual wheel chocks against a corresponding two to four wheels of the vehicle. Once the vehicle is ready to be moved, a user is required to manually remove all of the wheel chocks from the vehicle's tires. This process is inefficient and impractical.

In certain circumstances, it is desirable to transport vehicles such as all-terrain vehicles or utility vehicles in a trailer bed from one location to another. These types of vehicles can weigh up to 1500 lbs and are driven on and off the trailer bed. The current wheel chocks are not particularly designed for use with trailer beds and do not have the strength and durability to permit vehicles to drive over them. As a result, the loading and unloading time for these vehicles from the trailer bed is increased because the user has to manually place and remove the chocks from the trailer bed.

As such, there is a need in the industry for a wheel chock that addresses the limitations of the prior art. Specifically, there is a need for a wheel chock that can secure all wheels on a single axle of a vehicle at the same time. There is a further need for a wheel chock that a vehicle can drive over, thereby saving the user time by eliminating the need to set in place the chock, and remove the chock prior to movement of the vehicle. There is a further need for a wheel chock that can be used on a bed of a trailer to secure a vehicle thereon.

SUMMARY

A load-supporting chock for use with a trailer bed and configured to permit a vehicle to drive over the chock is provided. The load-supporting chock comprises an elongated member mechanically coupled to the bed of the trailer, the elongated member comprising a top face, a bottom face opposite the top face, a first slanted face coupled to the top and bottom faces, and a second slanted face coupled to the top and bottom faces, each of the first and second faces comprising a plurality of generally triangular ridges, the top face and first slanted face connecting at a first junction with a first rounded corner, the top face and second slanted face connecting at a second junction with a second rounded corner, wherein the plurality of triangular ridges of the elongated member enhance grip between wheels of the vehicle and the chock, wherein the first and second rounded corners of the elongated member enhance rotation of the wheels in contact with the elongated member as the vehicle drives over the chock.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
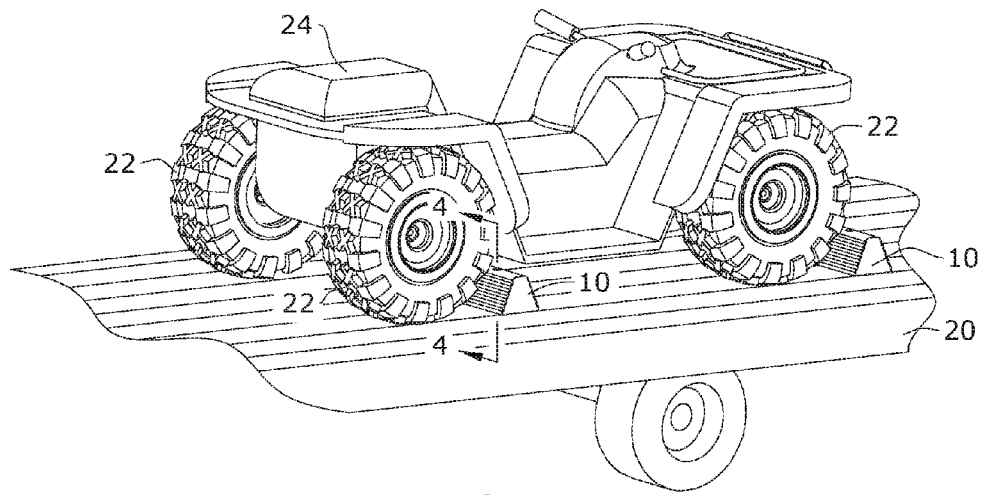
FIG. 1 depicts a perspective view of certain embodiments of the load-supporting chock shown in use.
Figure 2:
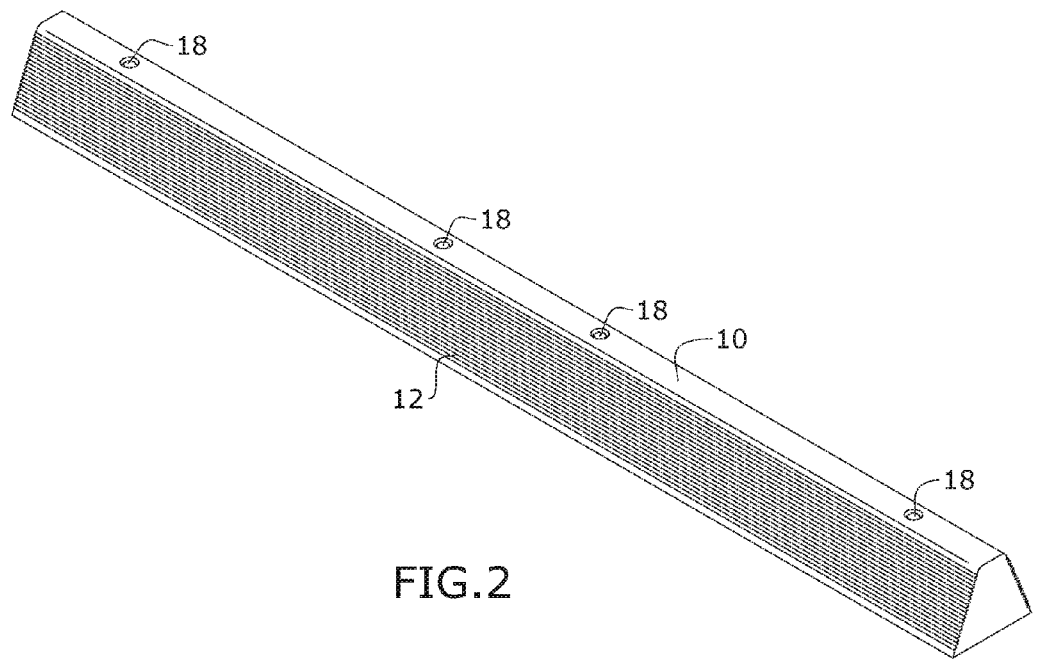
FIG. 2 depicts a perspective view of certain embodiments of the load-supporting chock.
Figure 3:
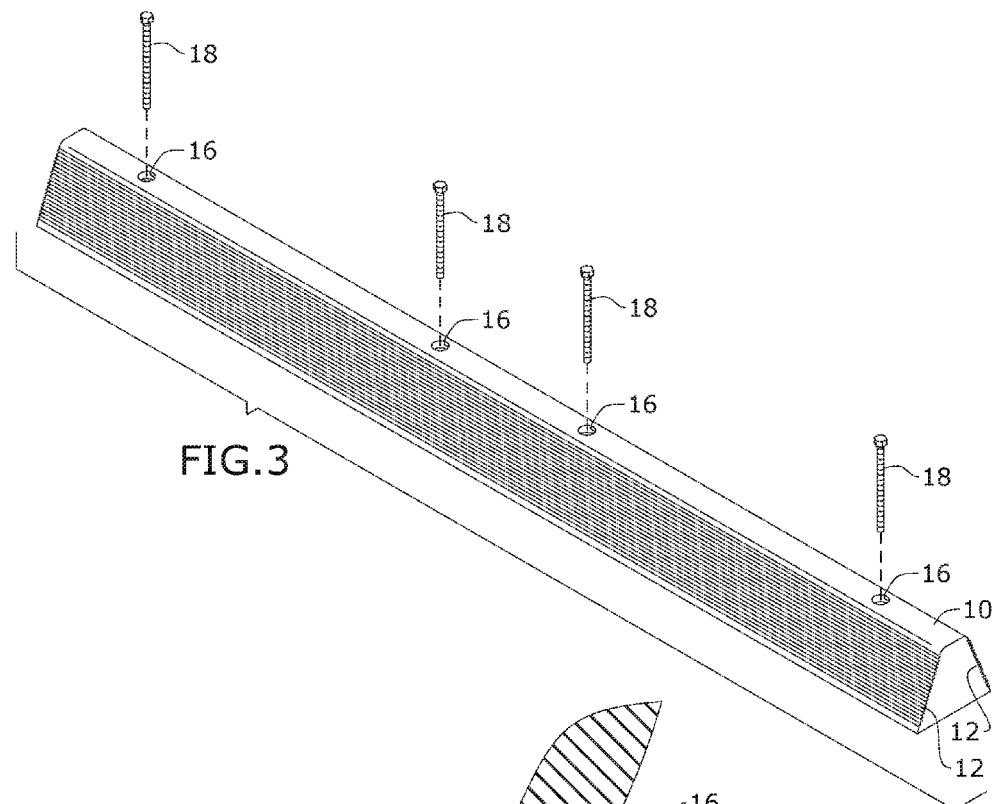
FIG. 3 depicts an exploded view of certain embodiments of the load-supporting chock.

As depicted in FIG. 1, chock 10 is configured for use with trailer bed 20 and vehicle 24, which preferably includes vehicles such as all-terrain vehicles and utility vehicles such as a Polaris Ranger Crew 900 or similar-type vehicle. However, it shall be appreciated that vehicle 24 may include smaller-sized vehicles such as riding lawn mowers, golf carts, other vehicles, and the like.

In a preferred embodiment, a pair of chocks 10 are coupled to trailer bed 20 by mechanical fasteners and designed to contact tires 22 of vehicle 24 to secure the vehicle in a stationary position. Chocks 10 comprise sufficient strength and durability to permit vehicle 24 to drive over the chocks when loading and unloading from trailer bed 20.

As depicted in FIGS. 2-7, each chock 10 comprises an elongated member made preferably from commercial grade rubber and comprises a top face, bottom face, first slanted face and second slanted face. The faces of chock 10 form a generally pyramidal cross-sectional shape. In one embodiment, the elongated member preferably has a length of approximately 72" and height of 4"-5". In alternative embodiments, the elongated member may have a length within the range of approximately 48"-96" and height within the range of approximately 3"-8". It shall be appreciated that the length of chock 10 is important because it should be sufficiently long to contact both tires 22 of an axle of vehicle 24.

Figure 4:
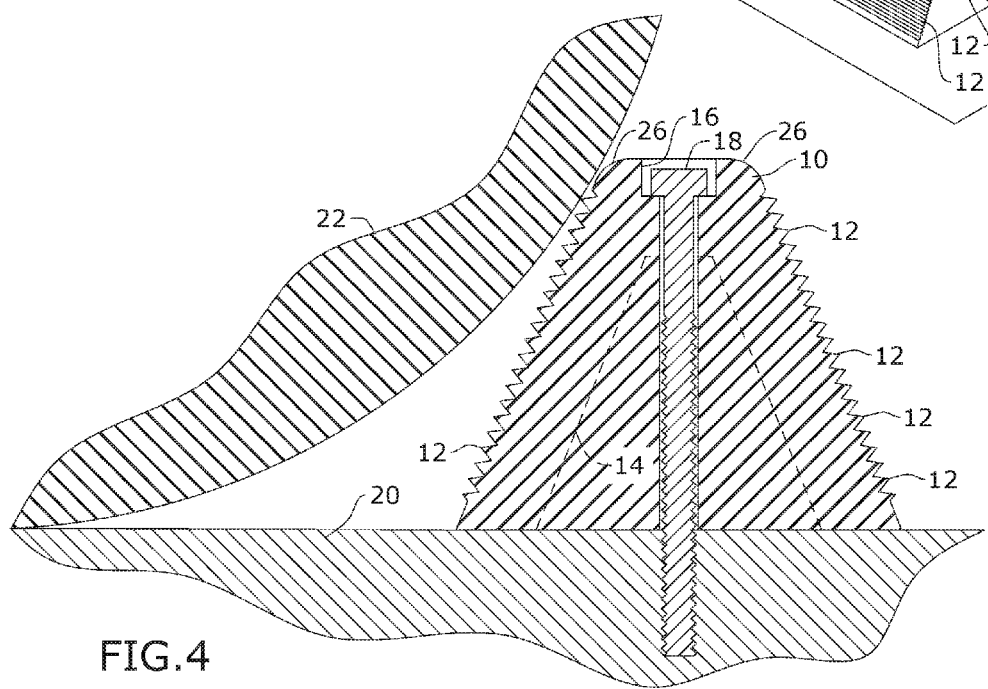
FIG. 4 depicts a section view of certain embodiments of the load-supporting chock taken along line 4-4 in FIG. 1.
Figure 5:
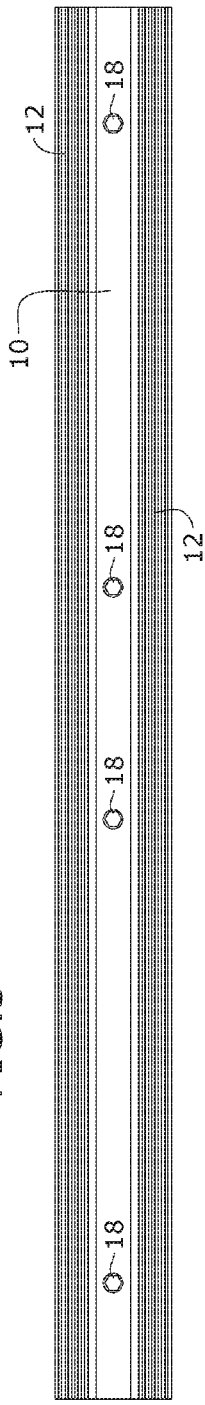
FIG. 5 depicts a top view of certain embodiments of the load-supporting chock.

As depicted in FIG. 4, the first and second slanted faces of chock 10 comprise a plurality of ridges 12. In a preferred embodiment, each ridge 12 comprises a generally triangular shape and extends across the entire slanted face. Ridges 12 enhance the grip between tire 22 and chock 10 when in contact with each other. The junctions between the first and second slanted faces and top face of chock 10 comprise rounded corners 26. Rounded corners 26 provide smooth surfaces to enhance the rotation of tires 22 when vehicle 24 drives over chock 10. Ultimately, the combination of ridges 12 and rounded corners 26 makes it easier for vehicle 24 to drive over chock 10.

Chock 10 comprises a plurality of bolt openings 16 disposed therethrough and spaced throughout the elongated member. Each bolt opening 16 is oriented generally perpendicular to a longitudinal axis of chock 10. As depicted in FIG. 4, each bolt opening 16 is configured to receive bolt 18, which extends out the bottom face of chock 10 and into an opening in trailer bed 20. This allows bolts 18 to secure chock 10 to trailer bed 20. In a preferred embodiment, each bolt 18 is preferably a lag bolt with an approximate length of 8" and diameter of ½".

Figure 6:
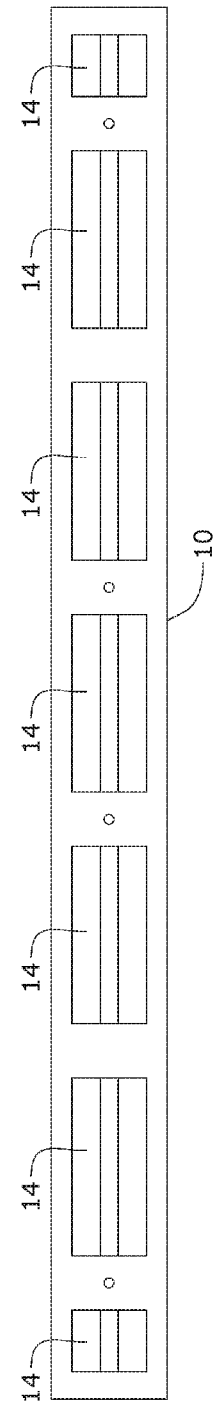
FIG. 6 depicts a bottom view of certain embodiments of the load-supporting chock.
Figure 7:
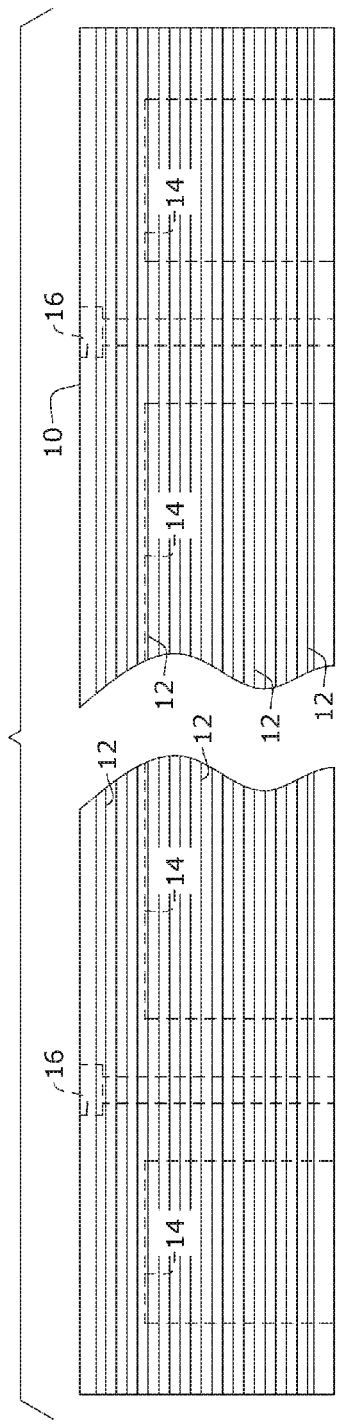
FIG. 7 depicts a side view of certain embodiments of the load-supporting chock without bolts 18 for illustrative clarity.

As depicted in FIGS. 4 and 6-7, a plurality of rectangular shaped openings 14 is disposed through the bottom face of chock 10 and evenly spaced throughout the elongated member. In a preferred embodiment, each rectangular shaped opening 14 is positioned approximately 3½" away from each adjacent rectangular shaped opening 14. The intermediate rectangular shaped openings 14 comprise an opening size of approximately 9½"×3½". The rectangular shaped openings 14 located at opposing ends of chock 10 comprise an opening size of approximately 3"×3½". The size and positioning of rectangular openings 14 in the elongated member provide chock 10 with the ideal combination of weight reduction, strength and stability. This design permits chock 10 to support vehicle 24 with a weight of at least 1500 lb as it drives over the chock.

In operation, a pair of chocks 10 are mechanically coupled to the top of trailer bed 20 as depicted in FIG. 1. The chocks 10 are designed to contact all tires 22 of vehicle 24 at the same time. This retains vehicle 24 in the stationary position. To unload or load vehicle 24 from trailer bed 20, vehicle 24 is driven over chocks 10 as needed. Each chock 10 comprises sufficient strength, stability and durability to support vehicle 24 as it drives over the chock.

It shall be appreciated that the components of chock 10 described in several embodiments herein may comprise any alternative known materials in the field and be of any color, size and/or dimensions. It shall be appreciated that the components of chock 10 described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A load-supporting chock for use with a trailer bed and configured to permit a vehicle to drive over the chock, the load-supporting chock comprising:
   an elongated member disposed on the bed of the trailer, the elongated member comprising a top face, a bottom face opposite the top face, a first slanted face coupled to the top and bottom faces, and a second slanted face coupled to the top and bottom faces, each of the first and second faces comprising a plurality of generally triangular ridges, the top face and first slanted face connecting at a first junction with a first rounded corner, the top face and second slanted face connecting at a second junction with a second rounded corner;
   a plurality of generally rectangular openings disposed through the bottom face of the elongated member, each rectangular opening in the plurality of rectangular openings located proximate an end of the elongated member comprising a first size smaller than a second size of other intermediate rectangular openings in the plurality of rectangular openings;
   a plurality of additional openings disposed through the elongated member, each additional opening of the plurality of additional openings oriented generally perpendicular to a longitudinal axis of the elongated member; and
   a plurality of bolts disposed through the plurality of additional openings in the elongated member, each bolt of the plurality of bolts configured to extend out of the bottom face to secure the elongated member to the bed of the trailer;
   wherein the plurality of triangular ridges of the elongated member enhance grip between wheels of the vehicle and the chock, wherein the first and second rounded corners of the elongated member enhance rotation of the wheels in contact with the elongated member as the vehicle drives over the chock.

2. The load-supporting chock of claim 1, wherein each of at least two generally rectangular openings in the plurality of rectangular openings is positioned approximately 3.5 inches from each adjacent rectangular opening in the plurality of rectangular openings.

3. The load-supporting chock of claim 2, wherein the elongated member is configured to support a weight of the vehicle that is at least 1500 lbs.

4. The load-supporting chock of claim 3, wherein the top face of the elongated member comprises a first surface area and the bottom face of the elongated member comprises a second surface area, wherein the second surface area is greater than the first surface area.

5. A load-supporting chock for use with a trailer bed and configured to permit a vehicle to drive over the chock, the load-supporting chock comprising:
   an elongated member disposed on the bed of the trailer, the elongated member comprising a top face, a bottom face opposite the top face, a first slanted face coupled to the top and bottom faces, and a second slanted face coupled to the top and bottom faces, each of the first and second faces comprising a plurality of generally triangular ridges, the top face and first slanted face connecting at a first junction with a first rounded corner, the top face and second slanted face connecting at a second junction with a second rounded corner;
   a plurality of generally rectangular openings disposed through the bottom face of the elongated member, each rectangular opening in the plurality of rectangular openings located proximate an end of the elongated member comprising a first size smaller than a second size of other intermediate rectangular openings in the plurality of rectangular openings, each generally rectangular opening in the plurality of rectangular openings being positioned approximately 3.5 inches from each adjacent rectangular opening in the plurality of rectangular openings;
   a plurality of additional openings disposed through the elongated member, each additional opening of the plurality of additional openings oriented generally perpendicular to a longitudinal axis of the elongated member; and
   a plurality of bolts disposed through the plurality of additional openings in the elongated member, each bolt of the plurality of bolts configured to extend out of the bottom face to secure the elongated member to the bed of the trailer;
   wherein the plurality of triangular ridges of the elongated member enhance grip between wheels of the vehicle and the chock, wherein the first and second rounded corners of the elongated member enhance rotation of the wheels in contact with the elongated member as the vehicle drives over the chock.

* * * * *